United States Patent
Hoo et al.

(10) Patent No.: US 7,053,563 B2
(45) Date of Patent: May 30, 2006

(54) CIRCUIT ARRANGEMENT FOR OPERATING LIGHT SOURCES

(75) Inventors: Henry Hoo, Singapore (SG); Ken Liu, Foshan (CN); Harald Schmitt, Munich (DE); Rene Twardzik, Traunreut (DE)

(73) Assignee: Patent Treuhand Gesellschaft fur elektrische Gluhlampen mbH, Munich (DE)

( * ) Notice: Subject to any disclaimer, the term of this patent is extended or adjusted under 35 U.S.C. 154(b) by 0 days.

(21) Appl. No.: 11/025,924

(22) Filed: Jan. 3, 2005

(65) Prior Publication Data

US 2005/0151481 A1    Jul. 14, 2005

(30) Foreign Application Priority Data

Jan. 9, 2004    (DE) .................... 10 2004 001 617

(51) Int. Cl.
*H01B 37/02*    (2006.01)
(52) U.S. Cl. ..................... 315/224; 315/291
(58) Field of Classification Search ............. 315/224, 315/225, 219, 291, 307, 209 R, 244, 247
See application file for complete search history.

(56) References Cited

U.S. PATENT DOCUMENTS

| | | | |
|---|---|---|---|
| 4,949,013 A | | 8/1990 | Zuchtriegel |
| 5,512,801 A | * | 4/1996 | Nilssen .................... 315/209 R |
| 5,757,140 A | * | 5/1998 | Nilssen .................... 315/209 R |
| 5,939,837 A | * | 8/1999 | Canova ....................... 315/247 |
| 6,316,883 B1 | * | 11/2001 | Cho et al. ................... 315/247 |
| 6,459,213 B1 | * | 10/2002 | Nilssen ....................... 315/224 |
| 6,700,331 B1 | * | 3/2004 | Benensohn ................. 315/224 |

FOREIGN PATENT DOCUMENTS

| | | | |
|---|---|---|---|
| WO | WO 90/09087 | | 8/1990 |
| WO | WO 02/47441 | | 11/2001 |
| WO | WO 02/47441 | * | 6/2002 |

* cited by examiner

*Primary Examiner*—Wilson Lee
*Assistant Examiner*—Hung Tran Vy

(57) ABSTRACT

In a circuit arrangement for operating light sources, inexpensive technologies for power factor correction can be used in combination. Owing to the combination of a dual charge pump and a valley fill circuit it is also possible to adhere to relevant standards for rated current harmonics even at rated powers of over 25 W whilst maintaining low component loading.

6 Claims, 1 Drawing Sheet

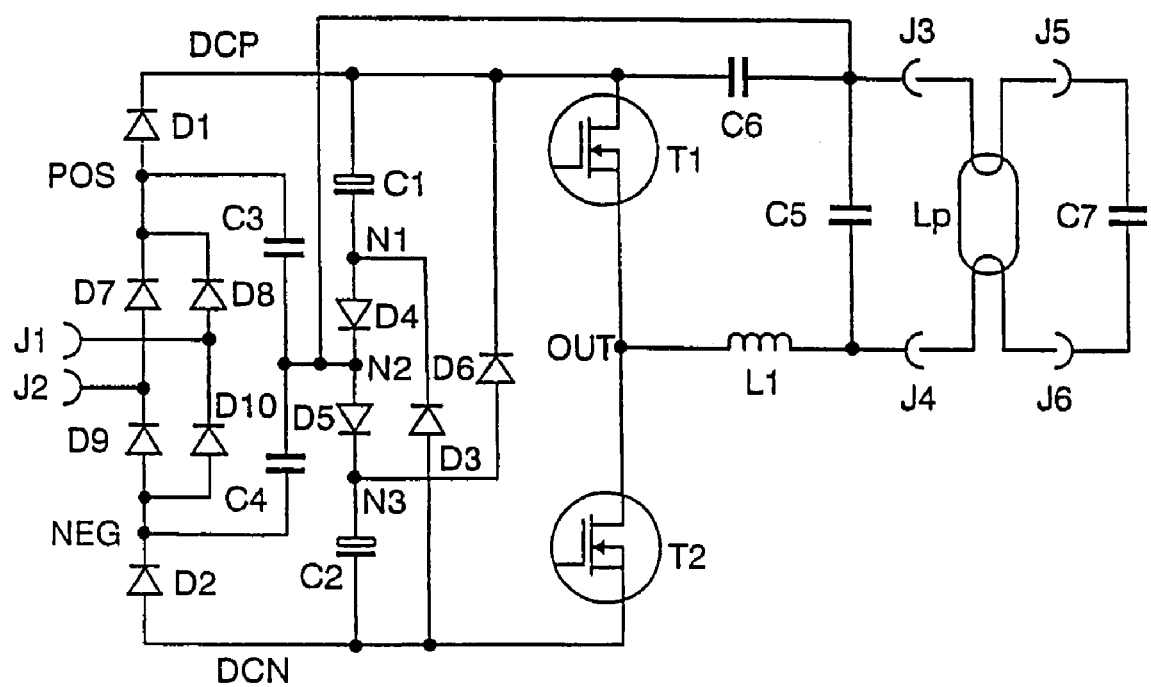

CIRCUIT ARRANGEMENT FOR OPERATING LIGHT SOURCES

A patent application which relates to a similar circuit arrangement has been filed on the same application date under our reference 2004P00168.

FIELD OF THE INVENTION

The invention relates to circuit arrangements for operating light sources. The invention relates in particular to circuit arrangements for supplying power to light sources from a supply system which are suitable for correcting a system-side power factor. The abbreviation PFC will be used below for the term power factor correction.

A feed system voltage has a system frequency. The term "radiofrequency" will be used below for frequencies which are substantially higher than the system frequency.

BACKGROUND OF THE INVENTION

The document WO 02/47441 (Hu) discloses an above-mentioned circuit arrangement. In this document, two PFC technologies are disclosed: a charge pump ("single feedback") and a so-called valley fill circuit ("double pump"). Here, the charge pump is connected upstream of the valley fill circuit, when seen from the system voltage. In addition, the charge pump and the valley fill circuit are supplied by the same radiofrequency voltage source.

Charge pumps are known, for example, from the document U.S. Pat. No. 4,949,013 (Zuchtriegel). The essential feature of a charge pump is the connection of a rectifier output to a pump diode. A radiofrequency voltage which is drawn from a load circuit is applied to the connection point formed. At this point it should be emphasized that only one rectifier output is connected to a pump diode, for which reason this part of the circuit arrangement is referred to as "single feedback" in WO 02/47441 (Hu).

Valley fill circuits are known, for example, from the document WO 90/09087 (Skalak). Of concern here is a passive PFC circuit comprising two storage capacitors and three diodes which is connected between two rectifier outputs. The operation of the valley fill circuit is based on the fact that the storage capacitors are connected via the diodes such that they are charged by a system voltage as a series circuit but are discharged by a load as a parallel circuit.

A valley fill circuit may also act, to a limited extent, as a charge pump by one of its diodes being split into two diodes. For this purpose, a radiofrequency AC voltage needs to be applied to the connection point between the two diodes resulting from the splitting. The document U.S. Pat. No. 6,316,883 (Cho) describes a valley fill circuit which has been modified in this manner. The operating device described there for discharge lamps in addition also has a separate charge pump. This charge pump is connected downstream of the valley fill circuit when seen from the system-voltage side, as a result of which a further storage capacitor is required.

In WO 02/47441 (Hu), the charge pump is connected upstream of the valley fill circuit. A further storage capacitor is thus not required. The radiofrequency AC voltage, which is supplied to the charge pump, is derived from the radiofrequency AC voltage which is fed to the modified valley fill circuit.

It can be understood from the document WO 02/47441 (Hu) that the circuit arrangement described there achieves good values for the power factor. Standards such as IEC 61000-3-2, however, prescribe in addition limit values for rated current harmonics. Here, a distinction is drawn between light sources which draw up to 25 W from the system voltage and light sources which draw more than 25 W. Above 25 W the specifications are substantially higher, i.e. the amplitudes of the rated current harmonics need to be substantially lower.

One subject matter of the document WO 02/47441 (Hu) is a compact fluorescent lamp having an integrated operating device. Such lamps are customary on the market up to a power consumption from the power supply system of 25 W. Since, up to 25 W the specifications in relevant standards for the rated current harmonics are low, the circuit arrangement disclosed in WO 02/47441 (Hu) can provide fluorescent lamp operation which conforms to standards up to 25 W.

There are many specifications for a circuit arrangement for operating light sources. The following specifications should be taken into consideration when designing these circuit arrangements:

low system-side power factor
low total harmonic distortion (THD) of the current drawn from the power supply system
rated current harmonics which conform to standards
high efficiency
low crest factor of the current through the light source
low radio interference
low costs
small geometric dimensions In order to operate fluorescent lamps at a power consumption from the power supply system of up to 25 W, the circuit arrangement disclosed in WO 02/47441 (Hu) is a good compromise for meeting the abovementioned specifications. Above 25 W, however, it becomes problematic to conform to the relevant standards as regards rated current harmonics. In particular for fluorescent lamps, the crest factor of the lamp current is limited by standards (for example IEC 60929) to a maximum value of 1.7. It is also problematic to maintain this limit value given a power consumption from the power supply system of over 25 W.

Dimensioning the circuit arrangement disclosed in WO 02/47441 (Hu) such that the standards as regards the rated current harmonics are adhered to even at a power consumption from the power supply system of over 25 W means that there is a considerably increased load on components in the circuit arrangement. This results in an increase in the costs, in greater geometric dimensions and in reduced efficiency.

If it is necessary also to adhere to the limit value for the crest factor of the lamp current according to IEC 60929, the components will be subject to an even greater load.

SUMMARY OF THE INVENTION

The object of the present invention is to develop a circuit arrangement for operating light sources based on the topology of a circuit arrangement according to WO 02/47441 (Hu) such that even at a power consumption from the power supply system of over 25 W, the rated current harmonics have values which conform to standards. For fluorescent lamp operation it is also the object of the present invention to make possible a lamp current crest factor which conforms to standards.

This object is achieved by a circuit arrangement for operating light sources which, in addition to the features known from WO 02/47441 (Hu), also has a charge pump which is connected to the negative rectifier output.

The invention is not suggested in WO 02/47441 (Hu) since express reference is made there (page 5/line 3) to "single feedback" in connection with the charge pump, whereas in the present invention the charge pump is of dual design by both a positive and a negative rectifier output being connected to a pump capacitor.

The valley fill circuit is a PFC circuit which does not require any substantial additional component loading. This additional loading affects components such as inductors and electronic switches and is caused by excess currents and voltages which are produced in connection with wattless power transport. However, with a valley fill circuit alone it is not possible to achieve any rated current harmonics which conform to standards. A lamp current crest factor which conforms to standards is also not achieved.

Using a charge pump it is possible to achieve rated current harmonics which conform to standards and a lamp current crest factor which conforms to standards. However, the use of a charge pump brings with it additional component loading. Charge pumps which are connected to the positive rectifier output are conventional.

The combination of a valley fill circuit with a charge pump results in rated current harmonics which conform to standards and a lamp current crest factor which conforms to standards with only low additional component loading. However, this is only the case at a power consumption from the power supply system of up to 25 W.

According to the invention, the charge pump is thus of dual design. That is to say a charge pump is connected both to the positive and to the negative rectifier output. At a power consumption from the power supply system of over 25 W, too, rated current harmonics which conform to standards and a lamp current crest factor which conforms to standards are thus achieved with only low additional component loading.

One particularly advantageous refinement of the invention is characterized in that an inverter is in the form of a half-bridge inverter. The inverter is connected between a positive and a negative busbar and as a result is supplied with a DC voltage. The inverter provides a radiofrequency AC voltage at an inverter output for operating light sources. The design of the inverter as a half-bridge inverter makes it possible to achieve a particularly high efficiency of the circuit arrangement.

A further, particularly advantageous refinement of the invention is characterized in that one connection of the light source is connected to the positive or negative busbar via a coupling capacitor. A further reduction of the rated current harmonics and the lamp current crest factor is thus achieved.

BRIEF DESCRIPTION OF THE DRAWING

The present invention will now be explained in more detail using exemplary embodiments with reference to a drawing. The FIGURE shows one exemplary embodiment of the invention for a fluorescent lamp having electrode filaments.

In the text below, transistors are indicated by the letter T, diodes by the letter D, capacitors by the letter C, inductors by the letter L and connections by the letter J, in each case followed by a number.

DETAILED DESCRIPTION OF THE INVENTION

In the FIGURE, the connections J1 and J2 form the system voltage input. A system voltage can be connected to J1 and J2. J1 and J2 are connected to the input of a rectifier. Means for suppressing radio interference can also be connected upstream of the rectifier.

In general, the rectifier comprises a known bridge circuit comprising the rectifier diodes D7, D8, D9 and D10 which provides the rectified system voltage at its positive rectifier output POS and at its negative rectifier output NEG. Owing to the charge pump it must be possible for the rectifier diodes to switch at a high frequency. It is also possible to use slow rectifier diodes. In this case, however, in each case a fast diode needs to be connected between the bridge circuit and the respective rectifier output.

A first diode D1, which is a pump diode, is connected at its anode to the positive rectifier output POS and at its cathode to a positive busbar DCP.

A second diode D2, which is likewise a pump diode, is connected at its cathode to the negative rectifier output NEG and at its anode to a negative busbar DCN.

The series circuit comprising a third D3, a fourth D4, a fifth D5 and a sixth diode D6 is connected between the positive DCP and the negative busbar DCN, in each case the cathodes of these diodes being directed towards the positive busbar DCP, and the connection points of these diodes forming the following nodes: a first node N1 between the third D3 and the fourth diode D4, a second node N2 between the fourth D4 and the fifth diode D5, and a third node N3 between the fifth D5 and the sixth diode D6.

A first storage capacitor C1 is connected between the positive busbar DCP and the first node N1. A second storage capacitor C2 is connected between the negative busbar DCN and the third node N3. The diodes D3, D4, D5 and D6 and the storage capacitors C1 and C2 form the valley fill circuit. It is a modified valley fill circuit as has been mentioned in connection with the abovementioned document U.S. Pat. No. 6,316,883 (Gyu). The diodes D4 and D5 form the abovementioned split diode pair. A radiofrequency voltage which is tapped off from a load circuit is applied to the node N2 connected between the diodes D4 and D5. A charge pump thus also operates to a limited extent in the valley fill circuit. A resistor may also be connected in series with the diodes. The rated current harmonics are thus further reduced.

The series circuit comprising two electronic switches T1 and T2 is connected between the positive and the negative busbars DCP and DCN. T1 and T2 form a half-bridge inverter which has an inverter output OUT at the connection point of T1 and T2. The half-bridge inverter draws power via the positive and the negative busbars DCP and DCN. Owing to the alternate switching on and off of T1 and T2, a radiofrequency AC voltage is applied to the inverter output OUT opposite the negative busbar DCN. This output voltage of the inverter has an inverter oscillating frequency which is substantially higher than the system frequency. The negative busbar DCN acts in this case as a reference potential for defining the output voltage of the inverter. Without representing a limitation to universality, the positive busbar DCP may also act as the reference potential.

T1 and T2 are in the form of MOSFETs in the exemplary embodiment. However, other electronic switches may also be used. A control voltage which brings about the alternate switching on and off of T1 and T2 is applied to the gate connections of T1 and T2. This control voltage is provided by a control circuit (not illustrated in the FIGURE). The control circuit may either contain a freely oscillating oscillator or be controlled by the load circuit, as a result of which a self-oscillating half-bridge inverter is formed.

A reactance network is connected to the inverter output OUT and has the main function of matching a source impedance of the inverter output OUT to a load impedance of the light source. In the exemplary embodiment, the reactance network comprises a series circuit comprising a lamp inductor L1, a resonant capacitor C5 and a coupling capacitor C6. Said series circuit is connected at one end to the inverter output OUT and at the other end to the positive busbar DCP. With the same effect, this series circuit may also be connected to the negative busbar DCN instead of to the positive one.

For basic operation there may be any desired sequence of the components in the above series circuit. In the exemplary embodiment, the lamp inductor L1 is connected to the inverter output OUT, and the coupling capacitor C6 is connected to the positive busbar DCP. The resonant capacitor C5 is connected between the lamp inductor L1 and the coupling capacitor C6.

The resonant capacitor C5 has two connections which are connected to output terminals J3, J4 to which a light source Lp can be connected. The figure illustrates by way of example a fluorescent lamp for a light source. The circuit arrangement may in principle, however, also be used for operating other light sources, such as high-pressure discharge lamps, light-emitting diodes or incandescent lamps. In order to operate light-emitting diodes or incandescent lamps a transformer may be provided which matches the output voltage of the inverter to the voltage level required by the light sources. The fluorescent lamp illustrated in the figure has two electrode filaments. In each case one connection of the electrode filaments is connected to the output terminals J3 and J4. The respective other connection of the electrode filaments is connected to a further resonant capacitor C7 via further connection terminals J5 and J6. The two resonant capacitors C5 and C7 are thus connected via the electrode filaments. Before the lamp Lp is started, a preheating current thus flows through the electrode filaments, which increases the life of the lamp Lp.

It has proved particularly advantageous if the lamp Lp is connected to the positive or negative busbar DCP or DCN via the coupling capacitor C6. The amplitude of the rated current harmonics and the lamp current crest factor can thus be decreased.

The FIGURE shows only one lamp Lp. However, it is also possible for a plurality of lamps to be operated in a series or parallel circuit.

The radiofrequency AC voltage which is fed to the node N2 is drawn in the exemplary embodiment from the potential at the connection J3. This corresponds to the potential at one connection of the resonant capacitor C5. The node N2 may, however, also be connected to other potentials which have a radiofrequency AC voltage. For example, the other connection of the resonant capacitor C5 or the inverter output OUT is suitable for this purpose. The variant selected in the exemplary embodiment has the smallest amplitude for the rated current harmonics and the lowest lamp current crest factor.

The radiofrequency AC voltage which is applied to the node N2 is also applied to a pump capacitor C3 which is connected to the positive rectifier output POS. The connection of the node N2 to the positive rectifier output POS via the pump capacitor C3 realizes a first charge pump.

According to the invention, the pump capacitor C4 is connected between the nodes N2 and the negative rectifier output NEG. A second charge pump is thus realized at the negative rectifier output NEG. The two pump capacitors preferably have the same value. The second charge pump according to the invention makes it possible to reduce the amplitude of the rated current harmonics and the value of the lamp current crest factor without buffer-storing large amounts of wattless power in the pump-capacitors C3 and C4. The load on the lamp inductor L1 and the electronic switches T1 and T2 is thus kept low.

The invention claimed is:

1. A circuit arrangement for operating light sources having the following features:
    a rectifier (D7, D8, D9, D10) having a system voltage input (J1, J2) which, when a system AC voltage at a system frequency is applied at its system voltage input, provides a rectified system AC voltage at a positive (POS) and a negative rectifier output (NEG),
    a first diode (D1) which is connected at its anode to the positive rectifier output (POS) and at its cathode to a positive busbar (DCP),
    a second diode (D2) which is connected at its cathode to the negative rectifier output (NEG) and at its anode to a negative busbar (DCN),
    a third (D3), a fourth (D4), a fifth (D5) and a sixth diode (D6) which are connected in series between the positive (DCP) and the negative busbar (DCN), in each case the cathode of these diodes (D3, D4, D5, D6) being directed towards the positive busbar (DCP), and the connection points of these diodes (D3, D4, D5, D6) forming the following nodes: a first node (N1) between the third (D3) and the fourth diode (D4), a second node (N2) between the fourth (D4) and the fifth diode (D5), and a third node (N3) between the fifth (D5) and the sixth diode (D6),
    a first (C1) and a second storage capacitor (C2), the first storage capacitor (C1) being connected between the positive busbar (DCP) and the first node (N1), and the second storage capacitor (C2) being connected between the negative busbar (DCN) and the third node (N3),
    an inverter (T1, T2), which is connected to the positive (DCP) and the negative busbars (DCN) for the purpose of supplying power and provides an inverter output voltage at an inverter output (OUT) opposite the negative busbar (DCN), said voltage having an inverter oscillating frequency which is substantially higher than the system frequency,
    a reactance network which is connected to the inverter output (OUT) and provides output terminals (J3, J4) for connecting light sources,
    a coupling between the reactance network and the node (N2) which brings about a voltage waveform at the node (N2) opposite the negative busbar (DCN) which has the inverter oscillating frequency,
    a first pump capacitor (C3) which is connected to the node (N2) and the positive rectifier output (POS),
    wherein
    the circuit arrangement has a second pump capacitor (C4), the second pump capacitor (C4) being connected to the node (N2) and the negative rectifier output (NEG).

2. The circuit arrangement for operating light sources as claimed in claim 1, characterized by the following features:
    the reactance network comprises a series circuit comprising a lamp inductor (L1), a resonant capacitor (C5) and a coupling capacitor (C6),
    the series circuit is connected at one end to the inverter output (OUT) and at the other end to the positive (DCP) or the negative busbar (DCN),
    the resonant capacitor (C5) has two connections which are connected to output terminals (J3, J4) to which a light source (Lp) can be connected,
    one connection of the resonant capacitor (C5) is connected to the second node (N2).

3. The circuit arrangement for operating light sources as claimed in claim 2, characterized by the following features:

the lamp inductor (L1) is connected to the inverter output, the coupling capacitor (C6) is connected to the positive (DCP) or the negative busbar (DCN), the resonant capacitor (C5) is connected between the lamp inductor (L1) and the coupling capacitor (C6), the connection of the resonant capacitor (C5) which faces the coupling capacitor (C6) is connected to the second node (N2).

4. The circuit arrangement for operating light sources as claimed in claim 2, wherein the light source (Lp) is a gas discharge lamp having two electrode filaments, and a second resonant capacitor (C7) is connected to the resonant capacitor (C5) from claim 2 via the electrode filaments.

5. The circuit arrangement for operating light sources as claimed in claim 1, wherein the light source (Lp) is a gas discharge lamp.

6. The circuit arrangement for operating light sources as claimed in claim 1, wherein the inverter is a half-bridge inverter which comprises a series circuit comprising two electronic switches (T1, T2) which are connected between the positive (DCP) and the negative busbars (DCN), and the inverter output (OUT) is the connection point of the two electronic switches (T1, T2).

* * * * *